(12) United States Patent
Wang

(10) Patent No.: US 11,038,343 B2
(45) Date of Patent: Jun. 15, 2021

(54) DRIVE CIRCUIT AND METHOD FOR CORRECTING INTERNAL OVERCURRENT SETTING VALUE THEREOF

(71) Applicants: CHONGQING HKC OPTOELECTRONICS TECHNOLOGY CO., LTD., Chongqing (CN); HKC CORPORATION LIMITED, Guangdong (CN)

(72) Inventor: Mingliang Wang, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 241 days.

(21) Appl. No.: 16/312,068

(22) PCT Filed: Oct. 24, 2018

(86) PCT No.: PCT/CN2018/111644
§ 371 (c)(1),
(2) Date: Dec. 20, 2018

(87) PCT Pub. No.: WO2020/042312
PCT Pub. Date: Mar. 5, 2020

(65) Prior Publication Data
US 2020/0136377 A1 Apr. 30, 2020

(30) Foreign Application Priority Data

Aug. 31, 2018 (CN) .......................... 201811014036.X

(51) Int. Cl.
*H02H 9/02* (2006.01)
*G02F 1/1333* (2006.01)
(Continued)

(52) U.S. Cl.
CPC ............. *H02H 9/02* (2013.01); *G02F 1/1333* (2013.01); *G09G 3/006* (2013.01); *G09G 3/3685* (2013.01); *G09G 2330/04* (2013.01)

(58) Field of Classification Search
CPC ............ H02H 9/02; H02H 9/00; H02H 9/025; G09G 3/2092; G09G 3/3648; G09G 3/006;
(Continued)

(56) References Cited

U.S. PATENT DOCUMENTS

| 8,502,459 B2 | 8/2013 | Son et al. |
| 2011/0266962 A1 | 11/2011 | Son et al. |

(Continued)

FOREIGN PATENT DOCUMENTS

| CN | 103580260 A | 2/2014 |
| CN | 103795034 A | 5/2014 |

(Continued)

OTHER PUBLICATIONS

International Search Report, dated Jun. 6, 2019, for Chongqing HKC Optoelectronics Technology Co., Ltd., et al., International Application No. PCT/CN2018/111644, Filed Oct. 24, 2018.
(Continued)

*Primary Examiner* — Rafael O De Leon Domenech
(74) *Attorney, Agent, or Firm* — Westbridge IP LLC

(57) ABSTRACT

Embodiments of the present disclosure provide a drive circuit and a method for correcting internal overcurrent setting value thereof. The first current signal output from the first chip is converted into the second current signal which
(Continued)

is configured to adjust the internal overcurrent setting value of the second chip by the timing controller.

17 Claims, 4 Drawing Sheets

(51) Int. Cl.
    *G09G 3/00*           (2006.01)
    *G09G 3/36*           (2006.01)

(58) Field of Classification Search
    CPC . G09G 3/3685; G09G 2330/04; G02F 1/1333
    See application file for complete search history.

(56) References Cited

U.S. PATENT DOCUMENTS

2015/0115852 A1     4/2015   Lee
2016/0231799 A1*   8/2016   Birnie ....................... G06F 1/28

FOREIGN PATENT DOCUMENTS

| CN | 105304050 B | 7/2017 |
| CN | 107578754 A | 1/2018 |

OTHER PUBLICATIONS

First Office Action in counterpart Chinese Application No. 201811014036.X, dated Sep. 26, 2019.
Second Office Action in counterpart Chinese Application No. 201811014036.X, dated Apr. 23, 2020.

* cited by examiner

| Current Value of First Current Signal(mA) | Current Value of Second Current Signal(mA) |
|---|---|
| 100 | 50 |
| 90 | 60 |
| 80 | 70 |
| 70 | 80 |
| 60 | 90 |
| 50 | 100 |
FIG. 5
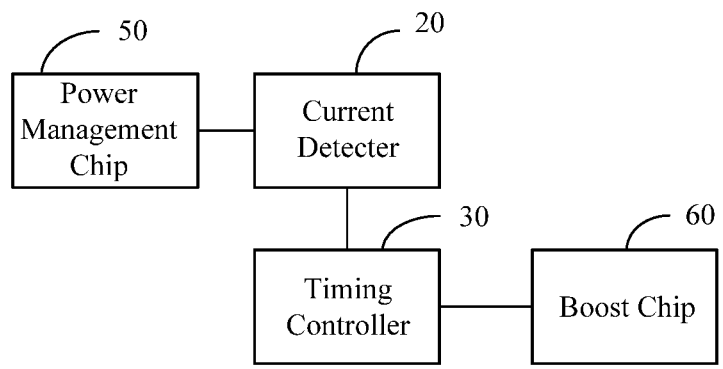
FIG. 6
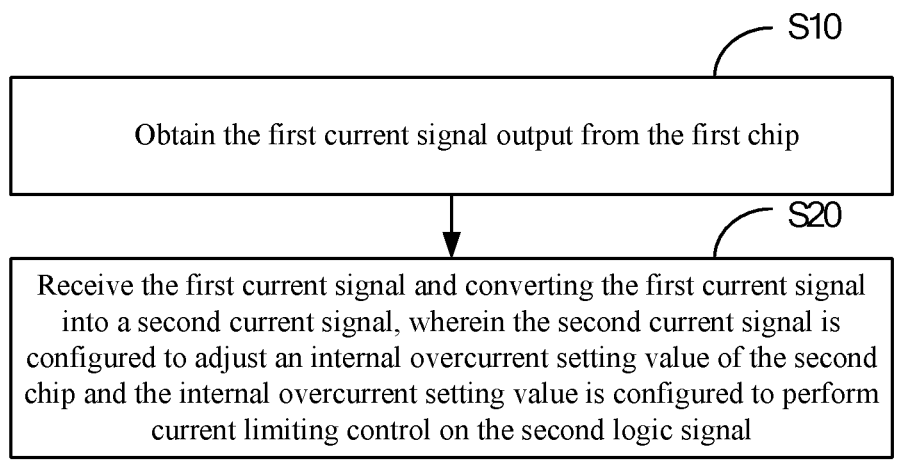
FIG. 7

DRIVE CIRCUIT AND METHOD FOR CORRECTING INTERNAL OVERCURRENT SETTING VALUE THEREOF

CROSS-REFERENCES TO RELATED APPLICATION

This application is the International Application No. PCT/CN2018/111644 for entry into US national phase with an international filing date of Oct. 24, 2018 designating US, now pending, and claims priority to Chinese Patent Application 201811014036.X, filed on Aug. 31, 2018, the content of which is incorporated herein by reference in its entirety.

BACKGROUND

Field of the Invention

The present disclosure relate to the field of electronic technologies, and in particular, to a drive circuit and a method for correcting internal overcurrent setting value thereof.

Description of Related Art

Traditionally, in the liquid crystal display panel the gate driving chip is usually integrated on the display panel. This design method greatly limits the reduction of the frame of the display. In order to reduce the frame of the display, the existing display usually adopts the gate driver less (GDL) architecture. In a GDL circuit, a gate driver chip is divided into a boost chip and a shift register chip, the boost chip is integrated on the driver board, and the shift register chip is integrated on the display panel. The driving of the display is implemented by the boost chip outputting a high voltage logic signal to the shift register chip, so that the length of the frame can be further reduced. Due to the uncontrollable factors in the production process, the display panel may be abnormally operated. In order to avoid the output currents of the boost chip and the power management chip being too large so as to burn out the display panel, protection mechanisms are usually set for the boost chip and the power management chip. By this mechanism, the current output of the boost chip is turned off when the current signal output from the boost chip is too large, or the current output of the power management chip is turned off when the current signal output from the power management chip is too large.

However, because the overcurrent protection circuits used by the boost chip and the power management chip often cannot turn off the corresponding current outputs in time, the panel burnout occurs, which has great security risks.

BRIEF SUMMARY OF THE INVENTION

Because the overcurrent protection circuits used by the existing boost chip and the power management chip often cannot turn off the corresponding current outputs in time, the panel burnout occurs, which has great security risks.

Embodiments of the present disclosure provides a drive circuit and a method for correcting internal overcurrent setting value thereof, which are intended to solve the problem that because the overcurrent protection circuits used by the boost chip and the power management chip often cannot turn off the corresponding current outputs in time, the panel burnout occurs, which has great security risks.

According to an embodiment of the present disclosure, a drive circuit comprises a first chip and a second chip, wherein the drive circuit further comprises:
a current detector configured to obtain a first current signal output from the first chip; and
a timing controller configured to receive the first current signal and convert the first current signal into a second current signal which is configured to adjust an internal overcurrent setting value of the second chip.

In an embodiment, the second chip comprises:
a booster configured to boost an input first logic signal and output a second logic signal; and
an overcurrent setting circuit configured to perform current-limiting control on the second logic signal according to the internal overcurrent setting value.

In an embodiment, the second chip is a boost chip.

In an embodiment, the first chip is a power management chip.

In an embodiment, the current detector comprises:
a first converter configured to convert the first current signal output from the first chip into a corresponding first data signal; and
a first storage configured to store the first data signal.

In an embodiment, the timing controller comprises:
a second storage configured to set and store a second data signal corresponding to the first data signal; and
a controller configured to obtain the first data signal and obtain the second data signal from the second storage according to the first data signal.

In an embodiment, the overcurrent setting circuit is further configured to receive the second data signal and setting the second data signal to the internal overcurrent setting value.

In an embodiment, the overcurrent setting circuit is further configured to set the current value of the second current signal to the internal overcurrent setting value.

In an embodiment, the overcurrent setting circuit is further configured to turn off the output of the second logic signal when the second logic signal is greater than or equal to the internal overcurrent setting value.

In an embodiment, the timing controller is connected to the current detector via an I2C interface.

According to another embodiment of the present disclosure, a drive circuit comprises:
a power management chip configured to output a first current signal;
a boost chip configured to boost an input first logic signal to output a second logic signal, and perform current-limiting control on the second logic signal according to an internal overcurrent setting value;
a current detector configured to obtain the first current signal; and
a timing controller configured to receive the first current signal and convert the first current signal into a second current signal which is configured to adjust the internal overcurrent setting value of the boost chip.

In an embodiment, the current detector comprises:
a first converter configured to convert the first current signal into a corresponding first data signal; and
a first storage configured to store the first data signal.

In an embodiment, the timing controller comprises:
a second storage configured to set and store a second data signal corresponding to the first data signal; and
a controller configured to obtain the first data signal and obtain the second data signal from the second storage according to the first data signal.

In an embodiment, the second data signal is configured to correct the internal overcurrent setting value.

According to another embodiment of the present disclosure, a method for correcting internal overcurrent setting value of a drive circuit, wherein the drive circuit comprises:
  a first chip configured to output a first current signal; and
  a second chip configured to receive a first logic signal, and boost the first logic signal to output a second logic signal;
  the method comprising:
  obtaining the first current signal output from the first chip;
  receiving the first current signal and converting the first current signal into a second current signal, wherein the second current signal is configured to adjust an internal overcurrent setting value of the second chip and the internal overcurrent setting value is configured to perform current-limiting control on the second logic signal.

In an embodiment, obtaining the first current signal output from the first chip comprises:
  using a current detector to obtain the first current signal output from the first chip.

In an embodiment, receiving the first current signal and converting the first current signal into a second current signal comprises:
  receiving the first current signal; and
  converting the first current signal into the second current signal according to the first current signal and a preset current conversion relationship table.

In an embodiment, converting the first current signal into the second current signal according to the first current signal and a preset current conversion relationship table comprises:
  obtaining a first current value of the first current signal;
  obtaining a second current value from the preset current conversion relationship table according to the first current value; and
  converting the first current signal to the second current signal according to the second current value.

In an embodiment, the second current signal is configured to adjust an internal overcurrent setting value of the second chip by:
  setting the current value of the second current signal to the internal overcurrent setting value.

In an embodiment, the internal overcurrent setting value is configured to perform current-limiting control on the second logic signal by:
  stopping output of the second logic signal in the case that a current value of the second logic signal is equal to or greater than the internal overcurrent setting value.

Embodiments of the present disclosure provide a drive circuit and a method for correcting internal overcurrent setting value thereof. The current detector obtains the first current signal output from the first chip. The timing controller receives the first current signal and converts the first current signal into a second current signal which is configured to adjust an internal overcurrent setting value of the second chip, so that an internal overcurrent setting value of the second chip can be adjusted according to the first current signal output from the first chip. Thus, the output current of the second chip can be turned off in time when it is too high, thereby solving the problem that because the overcurrent protection circuits used by the boost chip and the power management chip often cannot turn off the corresponding current outputs in time, the panel burnout occurs, which has great security risks.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are just some embodiments of the present disclosure, those skilled in the art can also obtain other drawings based on these drawings without paying any creative effort.

FIG. 5 is a lookup table of a conversion relationship between a current value of a first current signal and a current value of a second current signal according to an embodiment of the present disclosure;

FIG. 6 is a schematic diagram of a drive circuit according to another embodiment of the present disclosure;

FIG. 7 is a schematic flowchart of a method for correcting internal overcurrent setting value of a drive circuit according to an embodiment of the present disclosure;

DESCRIPTION OF THE EMBODIMENTS

The technical solutions in the embodiments of the present disclosure will be clearly described in the following with reference to the accompanying drawings in the embodiments of the present disclosure. It is obvious that the embodiments to be described are just some instead of all embodiments of the present disclosure. All other embodiments obtained by those skilled in the art based on the embodiments of the present disclosure without paying any creative effort should be included within the protection scope of the present disclosure.

The term "comprise" and its variations in the specification, claims and above description of the drawings of the present disclosure are intended to cover non-exclusive inclusions. For example, a process, method or system, product or device including a series of steps or units is not limited to the listed steps or units, but optionally also includes steps or units not listed, or optionally also includes other steps or units inherent to the process, method, product or equipment. Moreover, the terms "first", "second" and "third," etc. are used to distinguish different objects, and are not intended to describe a particular order.

In the GDL architecture, a GDL circuit divides a gate driver chip into a boost chip and a shift register. The boost chip is integrated on the driver board, and the shift register chip is integrated on the display panel. The driving of the display is implemented by the boost chip outputting a clock signal to the shift register chip, therefore the length of the frame can be reduced and the effective display area on the display panel can be increased. In order to protect the chips from burning due to overcurrent of the output signals, overcurrent protection mechanisms are usually provided inside the chips.

The power management chip is configured to convert the voltage output from the power supply into various types of voltage signals. In display device, the voltage signals output from the power management chip includes the turn-on voltage signal VGH for turning on the thin film transistor (TFT), the turn-off voltage signal VGL for turning off the TFT, etc. In order to avoid burning the display panel, an overcurrent protection mechanism is usually provided inside the power management chip. The boost chip is configured to boost the input low voltage logic signal and output a high voltage logic signal. In order to avoid the voltage value of the high voltage logic signal generated by the boost chip being too high, an overvoltage protection mechanism is usually provided at the output end of the level shift chip, thus the output signal is turned off in time when the output high voltage logic signal is overvoltage.

Figure 1:
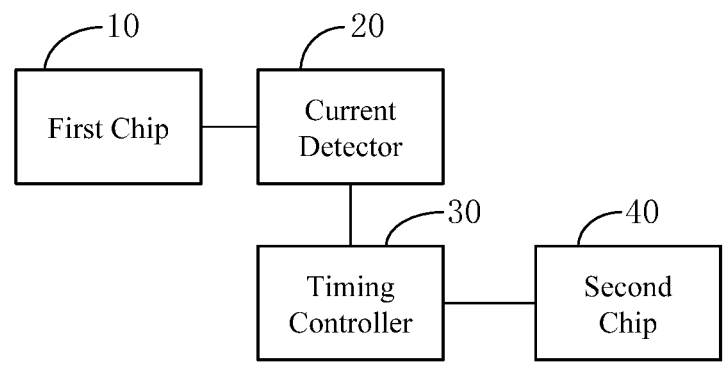
FIG. 1 is a schematic diagram of a drive circuit according to an embodiment of the present disclosure.

FIG. 1 is a schematic diagram of a drive circuit according to an embodiment of the present disclosure.

As shown in FIG. 1, the driving circuit according to this embodiment includes a first chip 10 and a second chip 40. In this embodiment, the driving circuit further includes a current detector 20 and a timing controller 30.

The current detector 20 is configured to obtain a first current signal output from the first chip 10.

The timing controller 30 is configured to receive the first current signal and convert the first current signal into a second current signal which is configured to adjust an internal overcurrent setting value of the second chip 40.

In an embodiment, the current detector 20 detects the first current signal output from the first chip 10, and the detection process includes a detecting step and a converting step. Specifically, the first chip 10 generates various voltage signals, for example a turn-on voltage signal, a turn-off voltage signal, and the like, according to the needs of the back-end circuit. The current detector 20 selects an output port to be detected to detect the first voltage signal. The first voltage signal may be the output voltage signal of any output port of the first chip 10. After detecting the first voltage signal, the current detector 20 converts the first voltage signal into a first current signal and outputs the converted first current signal.

In an embodiment, the timing controller 30 receives the first current signal output from the current detector 20 and converts the first current signal into a second current signal which is configured to adjust the internal overcurrent setting value of the second chip 40.

In an embodiment, the timing controller 30 can convert the first current signal into a second current signal which is configured to adjust an internal overcurrent setting value of the second chip 40 according to a preset current conversion relationship which may be set according to user needs. For example, the current conversion relationship may be setting the result obtained by subtracting the preset value from the current value received by the timing controller 30 as the current value of the second current signal. For example, the current value of the first current signal received by the timing controller 30 is 30 mA, the preset value set by the user is 20 mA, then according to the preset current conversion relationship the current value of the second current signal is 10 mA, so the timing controller 30 converts the first current signal with a current value of 30 mA into a second current signal with a current value of 10 mA to adjust the internal overcurrent setting value of the second chip 40.

In an embodiment, the preset current conversion relationship may alternatively be a preset linear relationship, for example, setting the current value of the second current signal to 0.9 times or 0.8 times the current value of the first current signal. After receiving the first current signal with a current value of 100 mA, the timing controller 30 performs a down-conversion process on the first current signal to obtain a second current signal having a current value of 80 mA, and outputs the second current signal to the second chip 40.

In an embodiment, the preset current conversion relationship may alternatively be calculated according to the preset algorithm set according to the user needs, or a pre-stored current lookup table is used to set the current value of the second current signal corresponding to the current value of the first current signal received by the timing controller 30.

In an embodiment, in order to enable the second chip 40 and the first chip 10 to turn off the current outputs when the overcurrent happens, in this embodiment the overvoltage protection value of the first chip 10 is not lower than the set overvoltage protection value of the second chip 40. Specifically, the current value of the first current signal is not lower than the current value of the second current signal.

In an embodiment, the current detector 20 may also store the current value of the converted first current signal.

Figure 2:
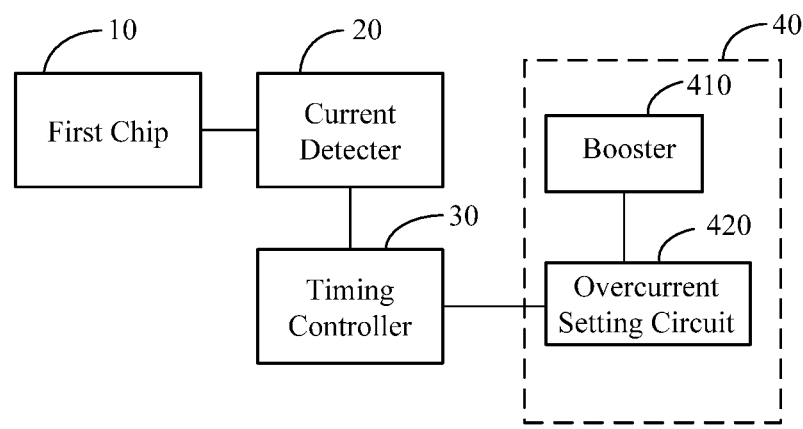
FIG. 2 is a schematic diagram of a drive circuit according to another embodiment of the present disclosure.

FIG. 2 is a schematic diagram of a drive circuit according to another embodiment of the present disclosure.

As shown in FIG. 2, the second chip 40 in this embodiment includes a booster 410 and an overcurrent setting circuit 420.

The booster 410 is configured to boost an input first logic signal and output a second logic signal.

The overcurrent setting circuit 420 is configured to perform current-limiting control on the second logic signal according to the internal overcurrent setting value.

In an embodiment, the overcurrent setting circuit 420 in the second chip 40 performs current-limiting control on the second logic signal output from the booster 410 according to the internal overcurrent setting value. In this embodiment, both the first logic signal and the second logic signal may be a voltage signal. Specifically, the current-limiting control on the second logic signal by the overcurrent setting circuit 420 may include turning off the output of the second logic signal or stepping down the second logic signal to prevent the second logic signal voltage output from the second chip 40 from being too high to burn the panel glass.

In an embodiment, the first chip 10 is a power management chip.

In an embodiment, the second chip 40 is a boost chip.

Figure 3:
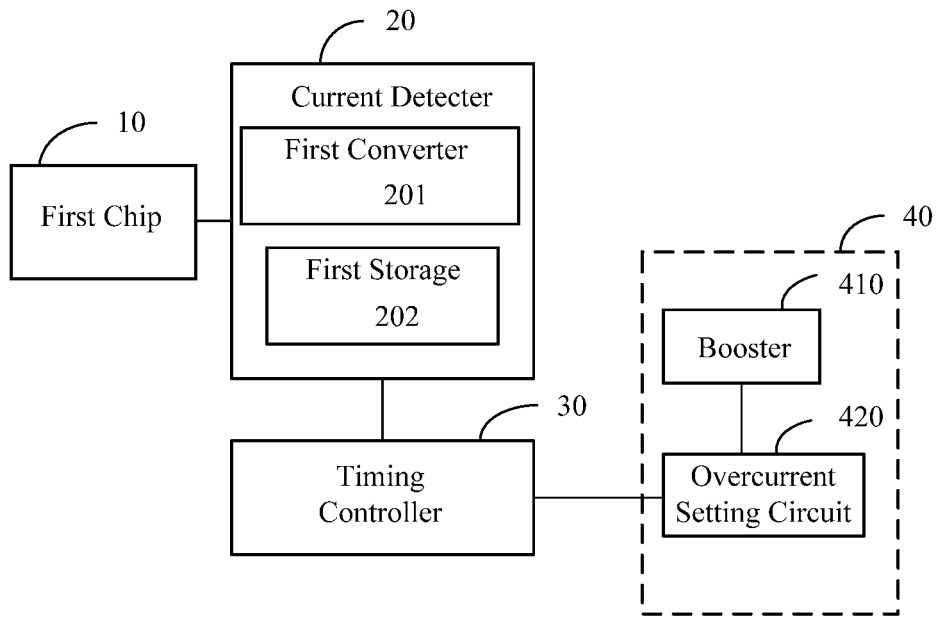
FIG. 3 is a schematic diagram of a drive circuit according to another embodiment of the present disclosure.

FIG. 3 is a schematic diagram of a drive circuit according to another embodiment of the present disclosure.

As shown in FIG. 3, the current detector 20 includes a first converter 201 and a first storage 202.

The first converter 201 is configured to convert the first current signal output from the first chip 10 into a corresponding first data signal.

The first storage 202 is configured to store the first data signal.

In an embodiment, the first converter 201 converts the received first current signal into a corresponding first data signal and stores the first data signal in the first storage 202. For example, when the current detector 20 detects the first current signal with the current value of 100 mA, the first converter 201 converts the first current signal into the first data signal which includes the information that the current value of the first current signal is 100 mA, and the first data storage is stored in the first storage 202 so as to be read by the timing controller 30.

Figure 4:
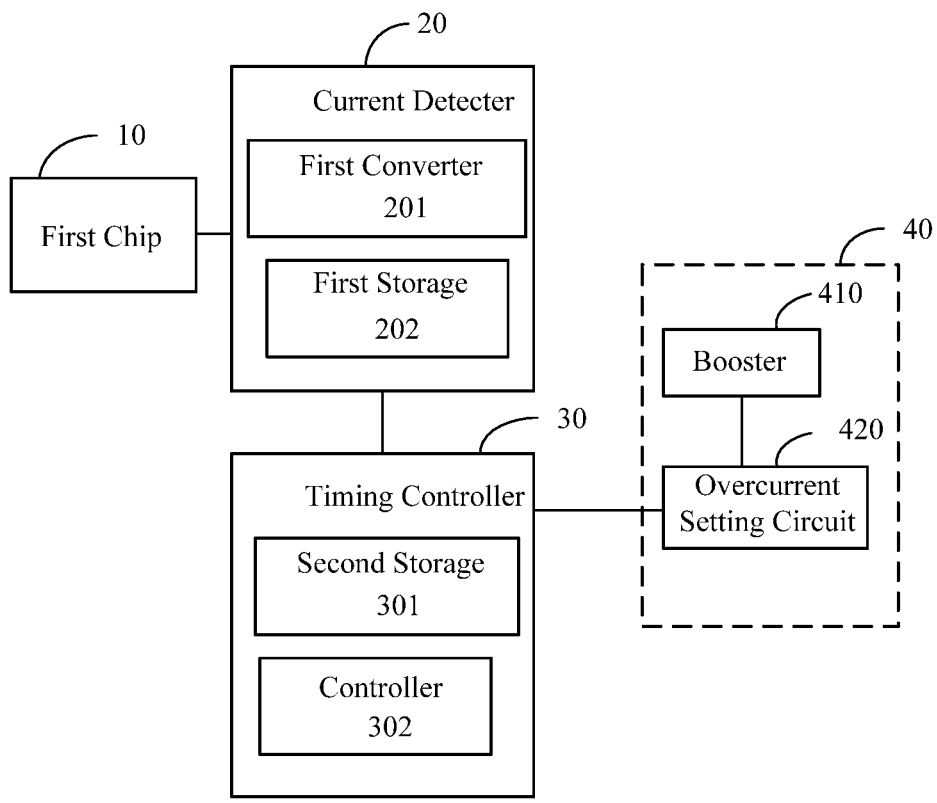
FIG. 4 is a schematic diagram of a drive circuit according to another embodiment of the present disclosure.

FIG. 4 is a schematic diagram of a drive circuit according to another embodiment of the present disclosure.

As shown in FIG. 4, the timing controller 30 includes a second storage 301 and a controller 302.

The second storage 301 is configured to set and store a second data signal corresponding to the first data signal.

The controller 302 is configured to obtain the first data signal and obtain the second data signal according to the first data signal.

In an embodiment, the controller 302 may be implemented by a general-purpose integrated circuit, such as a central processing unit (CPU), or by an application specific integrated circuit (ASIC).

In an embodiment, the controller 302 may alternatively be a screen drive board (also referred to as TCON, Timing Controller) of the display device.

In an embodiment, the second storage 301 stores a second data signal corresponding to the first data signal, and the second data signal may also be set according to user needs. The controller 302 reads the first data signal from the current detector 20, and then reads a corresponding second data signal from the second storage 301 according to the first data signal, where the second data signal includes a second data signal of the current value information corresponding to the first data signal. Specifically, the second data signal stored in the second storage 301 corresponding to the first data signal may be the lookup table of current conversion relationship, and the lookup table may be set according to user needs.

FIG. 5 shows a lookup table of a conversion relationship between the current value of the first current signal and the current value of the second current signal according to an embodiment of the present application.

As shown in FIG. 5, when the current value of the first current signal in the first data signal read by the controller 302 is 100 mA, the current value of the second current signal in the second data signal read from the second storage 301 is 50 mA, and when the current value of the first current signal in the first data signal read by the controller 302 is 90 mA, the current value of the second current signal in the second data signal read from the second storage 301 is 60 mA, and so on. The controller 302 obtains the second data signal including the information about the second current signal from the second storage 301 according to the information about the first current signal included in the first data signal.

In an embodiment, the lookup table of current conversion relationship may alternatively include a lookup table of conversion relationship between current value threshold intervals of the first current signal and current values of the second current signal. Specifically, a threshold interval in which the current value of the first current signal is located is firstly determined, and the current value of the second current signal corresponding to the threshold interval is then determined according to the threshold interval. For example, the overvoltage protection value of the first chip 10 is 100 mA, and every 10 mA is set as a threshold interval, so from 0 mA to 100 mA, there are ten threshold intervals, and the ten threshold intervals may correspond to ten identical or different current values of the second current signal. For example, the threshold intervals of 70 mA to 80 mA, 80 mA to 90 mA and 90 mA to 100 mA may all correspond to the current value 50 mA of the second current signal, and the threshold interval of 50 mA to 60 mA may correspond to the current value 80 mA of the second current signal, and so on. When the current value of the first current signal is detected, the threshold interval in which the current value is located is determined, for example, if the current value of the first current signal is detected as 55 mA, the second predetermined threshold corresponding to the threshold interval of 50 mA to 60 mA is 80 mA, so the controller 302 reads the second data signal including the information that the current value of the second current signal is 80 mA from the second storage 301.

In an embodiment, the timing controller 30 may further include a third converter configured to convert the second data signal into a corresponding second current signal and output the second current signal to the overcurrent setting circuit 420 in the second chip 40.

In an embodiment, the overcurrent setting circuit 420 is further configured to set the current value of the second current signal to the internal overcurrent setting value after receiving the second current signal.

In an embodiment, the timing controller 30 may alternatively send the second data signal read by the controller 302 from the second storage 301 directly to the overcurrent setting circuit 420 in the second chip, and the overcurrent setting circuit 420 corrects the internal overcurrent setting value according to the received second data signal.

In an embodiment, the overcurrent setting circuit 420 is further configured to set the current value of the second current signal to the internal overcurrent setting value.

Specifically, after receiving the second current signal, the overcurrent setting circuit 420 sets the current value of the second current signal to the internal overcurrent setting value of the second chip 40, and the current value of the second current signal may be adjusted based on the current value of the first current signal according to a preset current value conversion relationship. Therefore, the purpose of adjusting the internal overcurrent setting value of the drive circuit can be reached by setting the current value of the second current signal to the internal overcurrent setting value of the second chip 40.

In an embodiment, the overcurrent setting circuit 420 is further configured to turn off the output of the second logic signal when the second logic signal is greater than or equal to the internal overcurrent setting value.

In an embodiment, the timing controller 30 is coupled to the current detector via an I2C interface.

FIG. 6 is a schematic diagram of a drive circuit according to another embodiment of the present disclosure.

As shown in FIG. 6, the driving circuit in this embodiment includes a power management chip 10, a boost chip 40, a current detector 20 and a timing controller 30.

The power management chip 10 is configured to output a first current signal.

The boost chip 40 is configured to boost an input first logic signal to output a second logic signal, and perform current-limiting control on the second logic signal according to an internal overcurrent setting value.

The current detector 20 is configured to obtain the first current signal.

The timing controller 30 is configured to receive the first current signal and convert the first current signal into a second current signal which is configured to adjust the internal overcurrent setting value of the boost chip.

In an embodiment, the current detector 20 includes a first converter and a first storage.

The first converter is configured to convert the first current signal into a corresponding first data signal.

The first storage is configured to store the first data signal.

In an embodiment, the timing controller 30 includes a second storage and a controller.

The second storage is configured to set and store a second data signal corresponding to the first data signal.

The controller is configured to obtain the first data signal and obtain the second data signal from the second storage according to the first data signal.

In an embodiment, when the current value of the first current signal in the first data signal read by the controller 302 is 100 mA, the current value of the second current signal in the second data signal read from the second storage 301 is 50 mA, and when the current value of the first current signal in the first data signal read by the controller 302 is 90 mA, the current value of the second current signal in the second data signal read from the second storage 301 is 60 mA, and so on. The controller 302 obtains the second data signal including the information about the second current signal from the second storage 301 according to the information about the first current signal included in the first data signal.

In an embodiment, the lookup table of current conversion relationship may alternatively include a lookup table of conversion relationship between current value threshold intervals of the first current signal and current values of the second current signal. Specifically, a threshold interval in which the current value of the first current signal is located is firstly determined, and the current value of the second current signal corresponding to the threshold interval is then determined according to the threshold interval. For example, the overvoltage protection value of the first chip 10 is 100 mA, and every 10 mA is set as a threshold interval, so from 0 mA to 100 mA, there are ten threshold intervals, and the ten threshold intervals may correspond to ten identical or different current values of the second current signal. For example, the threshold intervals of 70 mA to 80 mA, 80 mA to 90 mA and 90 mA to 100 mA may all correspond to the current value 50 mA of the second current signal, and the threshold interval of 50 mA to 60 mA may correspond to the current value 80 mA of the second current signal, and so on. When the current value of the first current signal is detected, the threshold interval in which the current value is located is determined, for example, if the current value of the first current signal is detected as 55 mA, the second predetermined threshold corresponding to the threshold interval of 50 mA to 60 mA is 80 mA, so the controller 302 reads the second data signal including the information that the current value of the second current signal is 80 mA from the second storage 301.

In an embodiment, the second data signal is set to adjust the internal overcurrent setting value.

In an embodiment, the timing controller may alternatively send the second data signal read by the controller from the second storage directly to the boost chip 60, and the boost chip 60 corrects the internal overcurrent setting value according to the received second data signal, that is, the current value of the second data signal is set to the internal overcurrent setting value of the boost chip.

FIG. 7 is a schematic flowchart of a method for correcting internal overcurrent setting value of a drive circuit according to an embodiment of the present disclosure.

In this embodiment, the driving circuit includes a first chip and a second chip.

The first chip is configured to output a first current signal.

The second chip is configured to receive a first logic signal and boost the first logic signal to output a second logic signal.

As shown in FIG. 7, the method in this embodiment includes S10 and S20.

In S10, the first current signal output from the first chip is obtained.

In S20, the first current signal is received and converted into a second current signal, where the second current signal is configured to adjust an internal overcurrent setting value of the second chip and the internal overcurrent setting value is configured to perform current-limiting control on the second logic signal.

In an embodiment, S10 includes using a current detector to obtain the first current signal output from the first chip.

In an embodiment, the drive circuit further includes a current detector 20 and a timing controller 30. Obtaining the first current signal output from the first chip includes using the current detector 20 to detect the first current signal output from the first chip 10, and the detection process includes a detecting step and a converting step. Specifically, the first chip 10 generates various voltage signals, for example a turn-on voltage signal, a turn-off voltage signal, and the like, according to the needs of the back-end circuit. The current detector 20 selects an output port to be detected to detect the first voltage signal. The first voltage signal may be the output voltage signal of any output port of the first chip 10. After detecting the first voltage signal, the current detector 20 converts the first voltage signal into a first current signal and outputs the converted first current signal.

In an embodiment, receiving the first current signal and converting the first current signal to the second current signal includes using the timing controller 30 to convert the first current signal into a second current signal which is configured to adjust an internal overcurrent setting value of the second chip 40 according to a preset current conversion relationship which may be set according to user needs. For example, the current conversion relationship may be setting the result obtained by subtracting the preset value from the current value received by the timing controller 30 as the current value of the second current signal. For example, the current value of the first current signal received by the timing controller 30 is 30 mA, the preset value set by the user is 20 mA, then according to the preset current conversion relationship the current value of the second current signal is 10 mA, so the timing controller 30 converts the first current signal with a current value of 30 mA into a second current signal with a current value of 10 mA to adjust the internal overcurrent setting value of the second chip 40.

In an embodiment, the current detector 20 may also store the current value of the converted first current signal.

Figure 8:
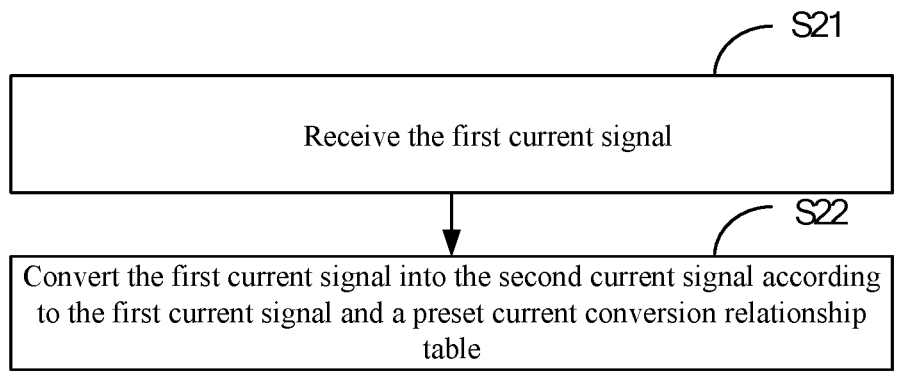
FIG. 8 is a schematic flowchart of step S20 in a method for correcting internal overcurrent setting value of a drive circuit according to an embodiment of the present disclosure.

FIG. 8 is a schematic flowchart of step S20 in a method for correcting internal overcurrent setting value of a drive circuit according to an embodiment of the present disclosure; and As shown in FIG. 8, S20 includes S21 and S22.

In S21, the first current signal is received.

In S22, the first current signal is converted into the second current signal according to the first current signal and a preset current conversion relationship table.

FIG. 5 shows a lookup table of a conversion relationship between the current value of the first current signal and the current value of the second current signal according to an embodiment of the present application.

As shown in FIG. 5, when the current value of the first current signal in the first data signal read by the controller 302 is 100 mA, the current value of the second current signal in the second data signal read from the second storage 301 is 50 mA, and when the current value of the first current signal in the first data signal read by the controller 302 is 90 mA, the current value of the second current signal in the second data signal read from the second storage 301 is 60 mA, and so on. The controller 302 obtains the second data signal including the information about the second current signal from the second storage 301 according to the information about the first current signal included in the first data signal.

In an embodiment, the lookup table of current conversion relationship may alternatively include a lookup table of conversion relationship between current value threshold intervals of the first current signal and current values of the second current signal. Specifically, a threshold interval in which the current value of the first current signal is located is firstly determined, and the current value of the second current signal corresponding to the threshold interval is then determined according to the threshold interval. For example, the overvoltage protection value of the first chip 10 is 100 mA, and every 10 mA is set as a threshold interval, so from 0 mA to 100 mA, there are ten threshold intervals, and the ten threshold intervals may correspond to ten identical or different current values of the second current signal. For example, the threshold intervals of 70 mA to 80 mA, 80 mA to 90 mA and 90 mA to 100 mA may all correspond to the current value 50 mA of the second current signal, and the threshold interval of 50 mA to 60 mA may correspond to the current value 80 mA of the second current signal, and so on. When the current value of the first current signal is detected, the threshold interval in which the current value is located is determined, for example, if the current value of the first current signal is detected as 55 mA, the second predetermined threshold corresponding to the threshold interval of 50 mA to 60 mA is 80 mA, so the controller 302 reads the second data signal including the information that the current value of the second current signal is 80 mA from the second storage 301.

Figure 9:
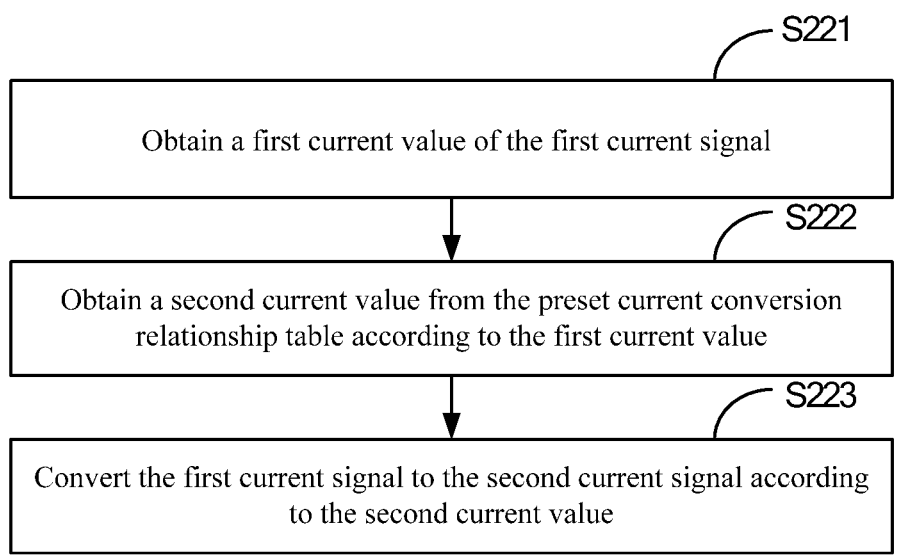
FIG. 9 is a schematic flowchart of step S22 in a method for correcting internal overcurrent setting value of a drive circuit according to an embodiment of the present disclosure.

FIG. 9 is a schematic flowchart of step S22 in a method for correcting internal overcurrent setting value of a drive circuit according to an embodiment of the present disclosure.

As shown in FIG. 9, S22 includes S221 to S223.

In S221, a first current value of the first current signal is obtained.

In S222, a second current value is obtained from the preset current conversion relationship table according to the first current value.

In S223, the first current signal is converted to the second current signal according to the second current value.

In an embodiment, the preset current conversion relationship may alternatively be a preset linear relationship, for example, setting the current value of the second current signal to 0.9 times or 0.8 times the current value of the first current signal. After receiving the first current signal with a current value of 100 mA, the timing controller 30 performs a down-conversion process on the first current signal to obtain a second current signal having a current value of 80 mA, and outputs the second current signal to the second chip 40.

In an embodiment, the preset current conversion relationship may alternatively be calculated according to the preset algorithm set according to the user needs, or a pre-stored current lookup table is used to set the current value of the second current signal corresponding to the current value of the first current signal received by the timing controller 30.

In an embodiment, the second current signal is configured to adjust an internal overcurrent setting value of the second chip by setting the current value of the second current signal to the internal overcurrent setting value.

In an embodiment, in order to enable the second chip 40 and the first chip 10 to turn off the current outputs when the overcurrent happens, in this embodiment the overvoltage protection value of the first chip 10 is not lower than the set overvoltage protection value of the second chip 40. Specifically, the current value of the first current signal is not lower than the current value of the second current signal.

In an embodiment, the internal overcurrent setting value is configured to perform current-limiting control on the second logic signal by stopping output of the second logic signal in the case that a current value of the second logic signal is equal to or greater than the internal overcurrent setting value.

In an embodiment, in order to enable the second chip 40 and the first chip 10 to turn off the current outputs when the overcurrent happens, in this embodiment the overvoltage protection value of the first chip 10 is not lower than the set overvoltage protection value of the second chip 40. Specifically, the current value of the first current signal is not lower than the current value of the second current signal.

The units in the apparatus in embodiments of the present disclosure may be combined, divided, or deleted according to actual needs.

The steps in the method in embodiments of the present application may be sequentially adjusted, merged, or deleted according to actual needs.

A person skilled in the art can understand that all or part of the process of implementing the methods in the above embodiments may be completed by instructing related hardware by a computer program, and the program may be stored in a computer readable storage medium. The program, when executed, may include the process of the methods according to the embodiments as described above. The storage medium may be a magnetic disk, an optical disk, a read-only memory (ROM); a random access memory (RAM) or the like.

The above description is only some embodiments of the present disclosure and is not intended to limit the present disclosure. Any modifications, equivalent substitutions and improvements made within the spirit and principles of the present disclosure are included in the protection scope of the present application.

What is claimed is:

1. A drive circuit comprising a first chip and a second chip, wherein the drive circuit further comprises:
    a current detector configured to obtain a first current signal from the first chip; and
    a timing controller, configured to receive the first current signal and convert the first current signal into a second current signal which is configured to adjust an internal overcurrent setting value of the second chip;
    wherein the current detector comprises:
    a first converter configured to convert the first current signal from the first chip into a corresponding first data signal; and
    a first storage configured to store the first data signal.

2. The drive circuit of claim 1, wherein the second chip comprises:
    a booster configured to boost an input first logic signal and output a second logic signal; and
    an overcurrent setting circuit configured to perform current-limiting control on the second logic signal according to the internal overcurrent setting value.

3. The drive circuit of claim 2, wherein the second chip is a boost chip.

4. The drive circuit of claim 1, wherein the first chip is a power management chip.

5. The drive circuit of claim 1, wherein the timing controller comprises:
    a second storage configured to set and store a second data signal corresponding to the first data signal; and a controller configured to obtain the first data signal and obtain the second data signal from the second storage according to the first data signal.

6. The drive circuit of claim 2, wherein:
the current detector comprises a first converter configured to convert the first current signal from the first chip into a corresponding first data signal and a first storage configured to store the first data signal;
the timing controller comprises a second storage configured to set and store a second data signal corresponding to the first data signal and a controller configured to obtain the first data signal and obtain the second data signal from the second storage according to the first data signal;
the overcurrent setting circuit is further configured to receive the second data signal and setting the second data signal to the internal overcurrent setting value.

7. The drive circuit of claim 2, wherein the overcurrent setting circuit is further configured to set the current value of the second current signal to the internal overcurrent setting value.

8. The drive circuit of claim 2, wherein the overcurrent setting circuit is further configured to turn off the output of the second logic signal when the second logic signal is greater than or equal to the internal overcurrent setting value.

9. The drive circuit of claim 1, wherein the timing controller is connected to the current detector via an I2C interface.

10. A drive circuit, comprising:
a power management chip configured to output a first current signal;
a boost chip configured to boost an input first logic signal to output a second logic signal, and perform current-limiting control on the second logic signal according to an internal overcurrent setting value;
a current detector configured to obtain the first current signal; and
a timing controller, configured to receive the first current signal and convert the first current signal into a second current signal which is configured to adjust the internal overcurrent setting value of the boost chip;
wherein the current detector comprises:
a first converter configured to convert the first current signal into a corresponding first data signal; and
a first storage configured to store the first data signal.

11. The drive circuit of claim 10, wherein the timing controller comprises:
a second storage configured to set and store a second data signal corresponding to the first data signal; and
a controller configured to obtain the first data signal and obtain the second data signal from the second storage according to the first data signal.

12. The drive circuit of claim 11, wherein the second data signal is configured to correct the internal overcurrent setting value.

13. A method for correcting internal overcurrent setting value of a drive circuit, wherein the drive circuit comprises:
a first chip configured to output a first current signal; and
a second chip configured to receive a first logic signal, and boost the first logic signal to output a second logic signal;
the method comprising:
obtaining the first current signal from the first chip;
receiving the first current signal and converting the first current signal into a second current signal, wherein the second current signal is configured to adjust an internal overcurrent setting value of the second chip and the internal overcurrent setting value is configured to perform current-limiting control on the second logic signal;
wherein receiving the first current signal and converting the first current signal into a second current signal comprises:
receiving the first current signal; and
converting the first current signal into the second current signal according to the first current signal and a preset current conversion relationship table.

14. The method of claim 13, wherein obtaining the first current signal from the first chip comprises:
using a current detector to obtain the first current signal from the first chip.

15. The method of claim 13, wherein converting the first current signal into the second current signal according to the first current signal and a preset current conversion relationship table comprises:
obtaining a first current value of the first current signal;
obtaining a second current value from the preset current conversion relationship table according to the first current value; and
converting the first current signal to the second current signal according to the second current value.

16. The method of claim 13, wherein the second current signal is configured to adjust an internal overcurrent setting value of the second chip by:
setting the current value of the second current signal to the internal overcurrent setting value.

17. The method of claim 13, wherein the internal overcurrent setting value is configured to perform current-limiting control on the second logic signal by:
stopping output of the second logic signal in the case that a current value of the second logic signal is equal to or greater than the internal overcurrent setting value.

* * * * *